(12) United States Patent
Schnabel

(10) Patent No.: US 9,339,965 B2
(45) Date of Patent: May 17, 2016

(54) EXTRUDING DEVICE

(75) Inventor: Astrid Schnabel, Seevetal (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 0 days.

(21) Appl. No.: 13/818,878

(22) PCT Filed: Aug. 23, 2011

(86) PCT No.: PCT/DE2011/001646
§ 371 (c)(1),
(2), (4) Date: Feb. 25, 2013

(87) PCT Pub. No.: WO2012/025101
PCT Pub. Date: Mar. 1, 2012

(65) Prior Publication Data
US 2013/0156876 A1    Jun. 20, 2013

(30) Foreign Application Priority Data
Aug. 23, 2010    (DE) .......................... 10 2010 036 075

(51) Int. Cl.
| B29C 47/06 | (2006.01) |
| B29C 47/14 | (2006.01) |
| B29C 47/56 | (2006.01) |
| B29C 47/08 | (2006.01) |
| B29C 47/16 | (2006.01) |

(Continued)

(52) U.S. Cl.
CPC .............. *B29C 47/56* (2013.01); *B29C 47/0822* (2013.01); *B29C 47/0837* (2013.01); *B29C 47/145* (2013.01); *B29C 47/16* (2013.01); *B29C 47/0019* (2013.01); *B29C 47/065* (2013.01); *B29C 47/0818* (2013.01); *B29L 2030/002* (2013.01)

(58) Field of Classification Search
CPC .............. B29C 47/0019; B29C 47/065; B29C 47/0818; B29C 47/0822; B29C 47/0837; B29C 47/12; B29C 47/14; B29C 47/145; B29C 47/56
USPC ................... 425/133.5, 186, 188, 192 R, 462
See application file for complete search history.

(56) References Cited

U.S. PATENT DOCUMENTS

| 4,548,568 A | * | 10/1985 | Herbert et al. | ............. | 425/131.1 |
| 4,619,599 A | | 10/1986 | Herbert et al. | | |
| 4,653,994 A | * | 3/1987 | Capelle | ..................... | 425/131.1 |

(Continued)

FOREIGN PATENT DOCUMENTS

| CA | 2326649 | 5/2001 |
| DE | 3430062 A | 2/1986 |

(Continued)

*Primary Examiner* — James Sanders
*Assistant Examiner* — Joseph Leyson
(74) *Attorney, Agent, or Firm* — Lucas & Mercanti, LLP; Klaus P. Stoffel

(57) ABSTRACT

The device serves for extruding and includes an extrusion head for connection to at least two extruders. Moreover, in the area of the extrusion head, at least one tool is arranged for shaping a product composed of at least two extruded materials. At least one expanding element is arranged in an area of the tool facing the extrusion head. The expanding element is constructed so as to be essentially smooth in an area of a first surface and has at least one flow path for the extruded material in the area of its second surface facing away from the first surface.

8 Claims, 8 Drawing Sheets

(51) Int. Cl.
 *B29C 47/00* (2006.01)
 *B29L 30/00* (2006.01)

(56) References Cited

U.S. PATENT DOCUMENTS

| | | | |
|---|---|---|---|
| 4,824,353 A * | 4/1989 | Hirschkorn | 425/190 |
| 5,061,166 A * | 10/1991 | Gohlisch et al. | 425/133.5 |
| 6,273,703 B1 | 8/2001 | Hirschkorn | |
| 7,309,223 B2 * | 12/2007 | Hasegawa | 425/192 R |
| 2003/0091678 A1 * | 5/2003 | Jaffer et al. | 425/206 |

FOREIGN PATENT DOCUMENTS

| | | |
|---|---|---|
| DE | 19517247 | 11/1996 |
| DE | 19803269 A | 8/1999 |
| EP | 0270816 | 6/1988 |
| EP | 1103391 | 5/2001 |
| JP | 2001047494 | 2/2009 |
| KR | 101042925 | 6/2011 |

\* cited by examiner

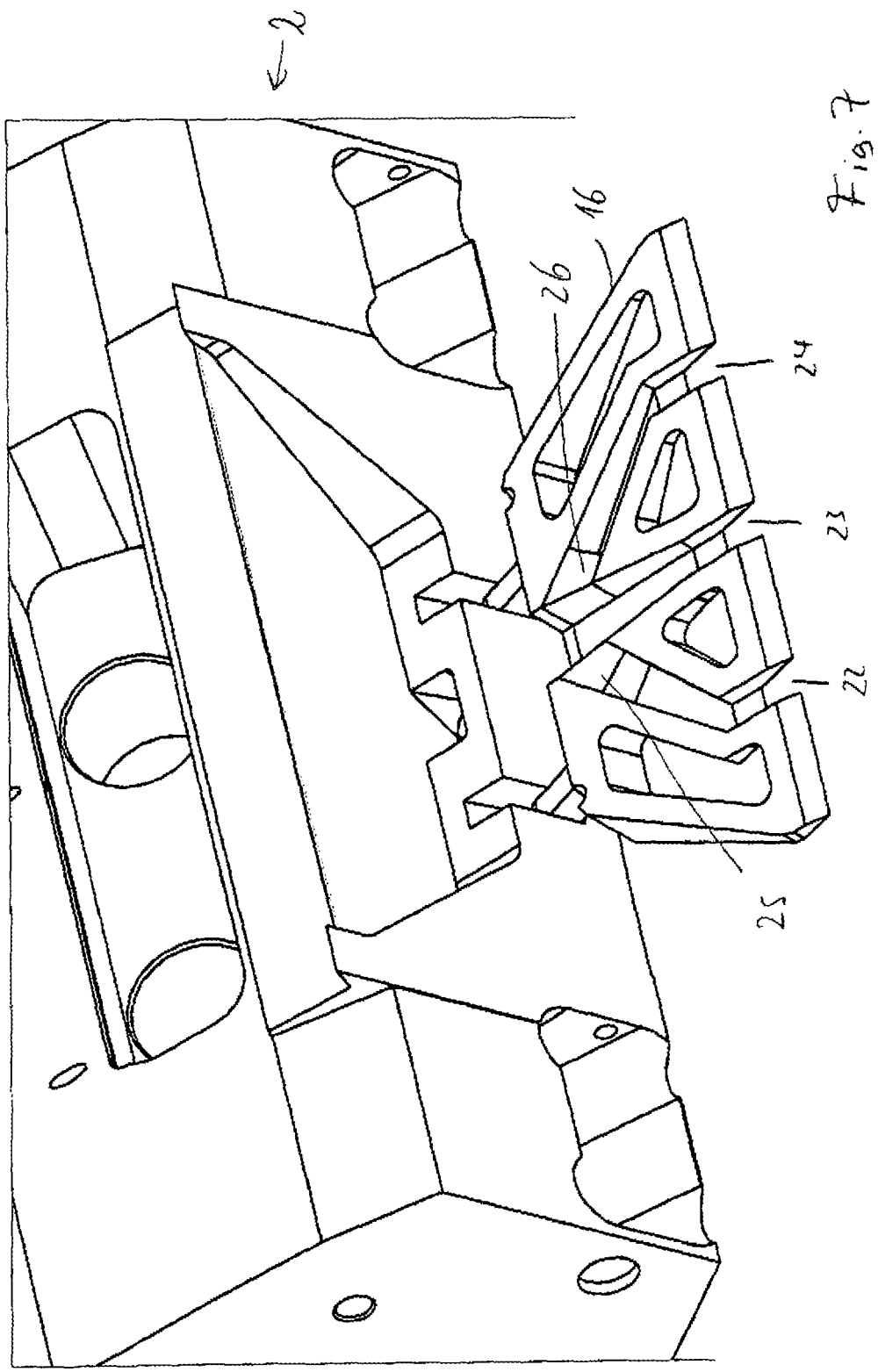

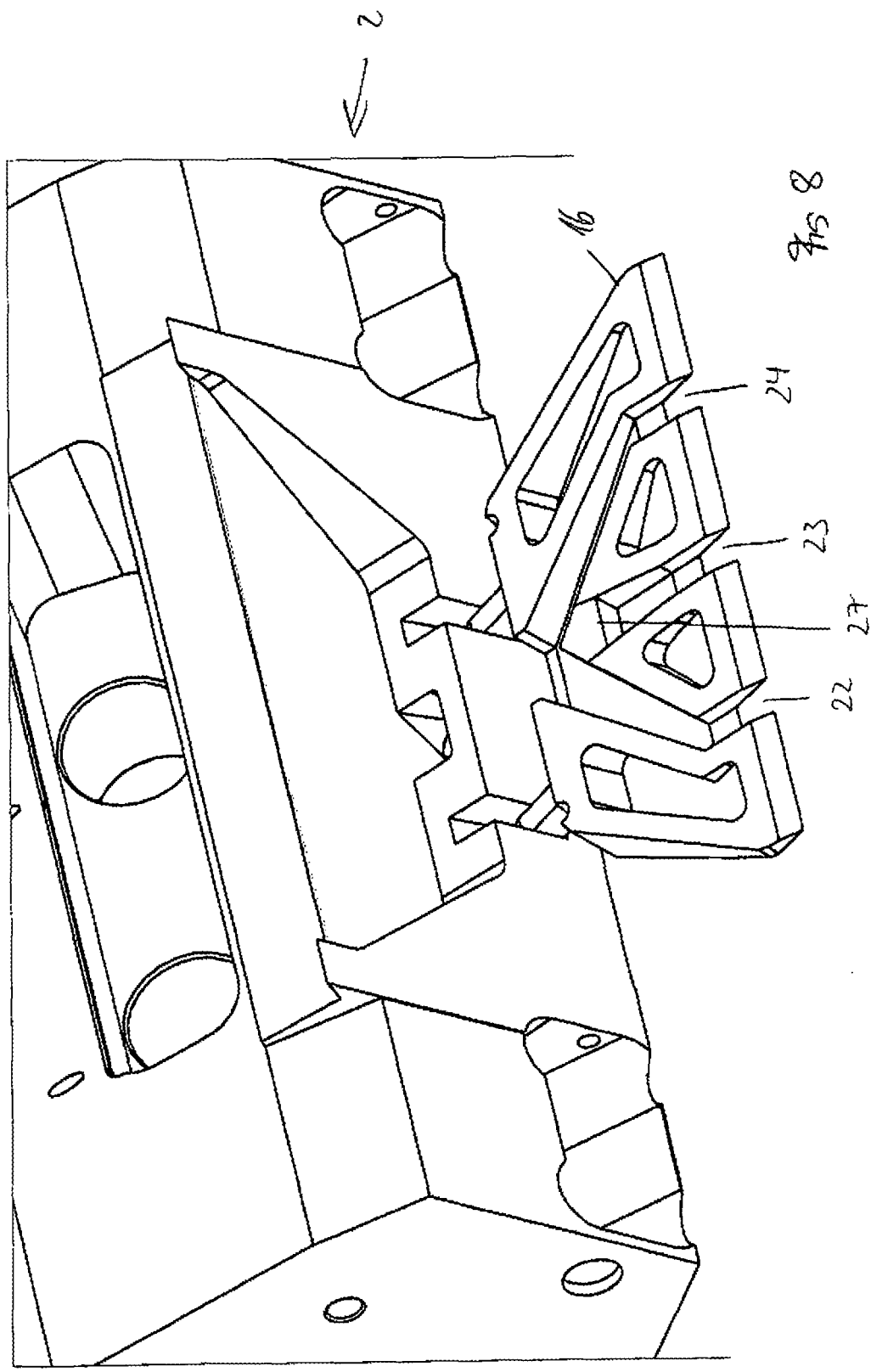

EXTRUDING DEVICE

The present application is a 371 of International application PCT/DE2011/001646, filed Aug. 23, 2011, which claims priority of DE 10 2010 036 075.9, filed Aug. 23, 2010, the priority of these applications is hereby claimed and these applications are incorporated herein by reference.

BACKGROUND OF THE INVENTION

The invention relates to an extruding device which includes an extrusion head for connection to at least two extruders, as well as at least one tool for shaping a product composed of at least two extruded materials.

Devices of this type are used in particular for producing strip shaped elements of elastomer materials for the manufacture of tires. Such strips frequently consist of two or more layers of different elastomer materials. These layers frequently have a poor electrical conductivity. The use of automobile tires which are constructed from such continuously poorly conducting layers leads to the risk of an electrostatic charging of the vehicle.

For avoiding this effect of the electrostatic charging, it is already known to embed additional electrically conductive areas in the strip shaped materials. For example, EP 1 103 391 describes a device for co-extruding rubber mixtures which is arranged in the area of the extrusion head near the discharge opening of a pipe-like nozzle which divides the oncoming material into two partial flows. On the side of the nozzle facing away from the flow direction, a discharge gap is located from which the additional material emerges which then reconnects the two areas which had previously been separated. The additional material forms the layer which penetrates the electrically nonconductive layers.

By placing such an additional nozzle in the principal flow path, the flow conditions, particularly the occurring flow resistances, are changed. Therefore, it is difficult to achieve an exactly reproducible material distribution when using such a device.

SUMMARY OF THE INVENTION

It is the object of the invention to construct a device of the above mentioned type in such a way that, with a simple structure, a manufacture of high quality material strips with uniform material properties is reinforced.

In accordance with the invention, this object is met by arranging at least one expanding element in an area of the tool facing the extrusion head, and by constructing the expansion element so as to be essentially smooth in the area of a first surface, and providing at least one channel for the extruded material in the area of its second surface facing away from the first surface.

In accordance with the invention, a co-extrusion head with one or more head parts is made available in which at least one of the head elements has an additional flow channel which is supplied with material through a separate additional extruder. In particular, it is being considered to integrate a standard existing head part in a separate additional injection molding tool. One or more flow channels are worked into the injection molding tool through which the material is conducted to the injection molding tool. As a result, an additional profiled strip is incorporated into the co-extrusion profile. The co-extrusion heads may have foldable head parts.

The use of the expanding element according to the invention makes it particularly possible to use co-extrusion injection molding heads having a basic construction which have been successfully used for many years and to modify them merely by adding the expanding elements.

In accordance with the invention, it is particularly possible to carry out the introduction of an additional mixture into the extruded rubber profile. In particular, this may be a conductive mixture. For example, an application can take place in profiles for tire running surfaces with a high proportion of silica. This increased proportion of silica typically leads to a reduction of the rolling resistance. The conductive mixture, a so-called chimney profile, conducts the electrostatic charges of the vehicle into the road surface.

In particular, it is being considered to have the additional and preferably electrically conductive mixture extend in the end profile through several superimposed mixture areas. These superimposed mixture areas are typically electrically poorly conductive.

Because of the comparatively small spatial extension of the material portion supplied by the expanding element, it is, as a rule, sufficient to use an additional extruder with a small screw cross section. The construction and guidance of the extrusion channel for the expanding element takes place analogously to the remaining extrusion channels in the co-extrusion head.

The integration of the expanding element according to the invention as an additional injection molding tool in an existing head part avoids the use of a separate complete head part. The expanding element can be constructed as an additional injection molding tool as a single part with incorporated flow channels or as a tool carrier with modular tool inserts. Independently of the concrete type of construction, the expanding element can be screwed or clamped in the area of the existing head part.

The ease of operation can be further increased by arranging the expanding element so as to be pivotable in the area of the extrusion head.

In accordance with a typical embodiment, it is provided that the extrusion head has a plurality of flow channels.

For making available the material for the additional strip, it is provided that the expanding element can be connected through a flow channel to an additional extruder.

A modular construction of the device is reinforced by arranging all connections for connecting to extruders on the outer side of the extrusion head.

A particularly uniform production is achieved if the flow channels are joined in the area of the tool.

An adjustment to different requirements is achieved by providing the expanding element with at least two flow paths.

In particular, it is considered to make at least one of the flow paths closable by a flow path blocker.

In the drawings, embodiments of the invention are schematically illustrated. In the drawing:

BRIEF DESCRIPTION OF THE DRAWING

FIG. 7 shows an embodiment modified relative to FIG. 6 for supplying one or two strips, in which blockers are used in the areas of the flow paths which are not needed, and FIG. 8 shows the arrangement according to FIG. 7 with a changed arrangement of the blockers in the flow paths.

DETAILED DESCRIPTION OF THE INVENTION

Figure 1:
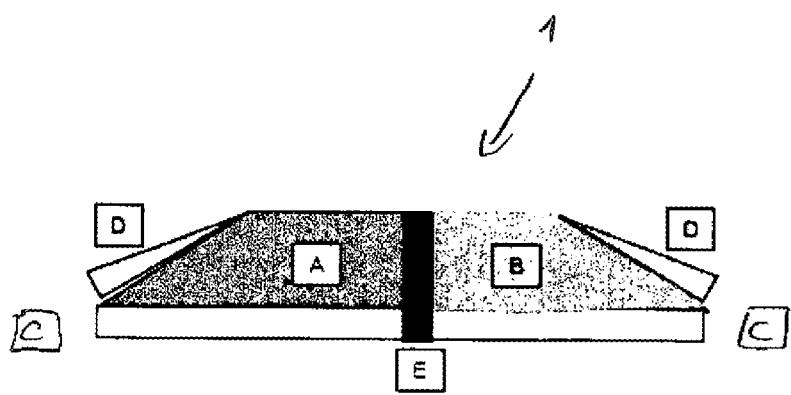
FIG. 1 shows a schematic cross section of an extruded strip which is composed of different material areas which are delimited relative to each other.

FIG. 1 shows a schematic cross section through an extruded strip 1. The strip 1 consists of several material areas A, B, C, D, E which are delimited relative to each other. The same letters denote the use of the respectively same materials. In accordance with a typical embodiment in the manufacture of strips 1 of an elastomer material for the manufacture of vehicle tires, the materials A, B, C are electrically nonconductive or poorly conductive. A material having good electrical conductivity is used for the area E. The material area E extends through the material layers of the materials A, B, C.

Figure 2:
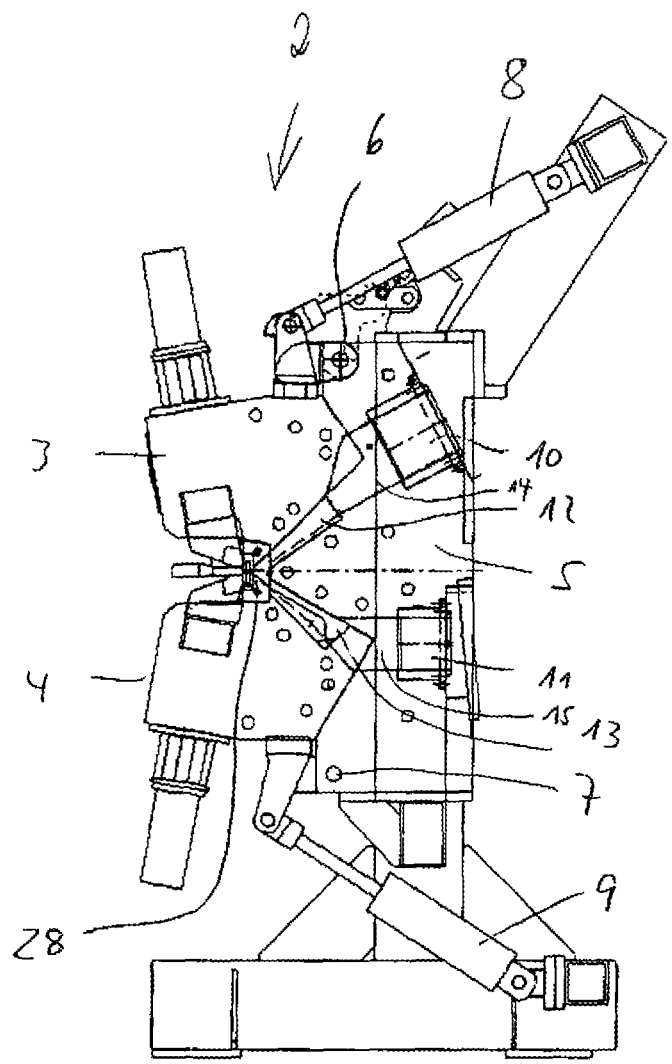
FIG. 2 is a schematic illustration of a duplex extrusion head prior to an integration of the additional element.

FIG. 2 shows as an example an extrusion head 2 which is intended for connection with two extruders which are not illustrated. In accordance with the illustrated embodiment, the extrusion head 2 has two pivotable head parts 3, 4, wherein pivoting can be effected relative to a head base 5. The head parts 3, 4 are connected to the head base 5 through pivot joints 6, 7 as well as through cylinders 8, 9. The cylinders 8, 9 are typically constructed as hydraulic cylinders.

When positioning pistons of the cylinders 8, 9, pivoting of the head parts 3, 4 takes place around the pivot joints 6, 7.

The head base 5 has, in the area of its rear side facing away from its head parts 3, 4, connections 10, 11 for connecting to extruders which are not illustrated. Insert elements 12, 13 are arranged between the head parts 3, 4 and the head base 5 for delimiting flow channels 14, 15 at least over portions thereof.

Figure 3:
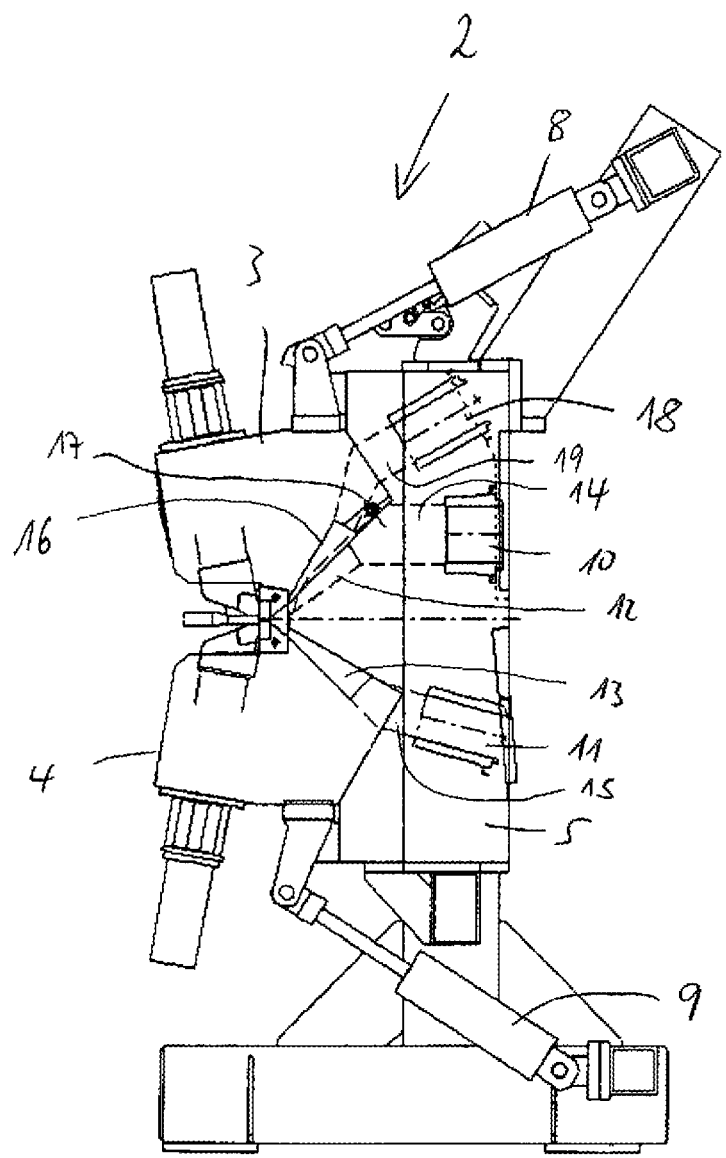
FIG. 3 shows the extrusion head according to FIG. 2 after an integration of the expanding element.

FIG. 3 shows an arrangement modified as compared to FIG. 2 with an expanding element 16 according to the invention. In the illustrated embodiment, the expanding element 16 is arranged so as to be pivotable about a pivot joint 17. The connections 10, 11 were slightly modified with respect to their arrangement relative to FIG. 2 in order to provide sufficient space for a connection 18 which is connected through a flow channel 19 to an expanding element 16 and serves for connecting an additional extruder.

Figure 4:
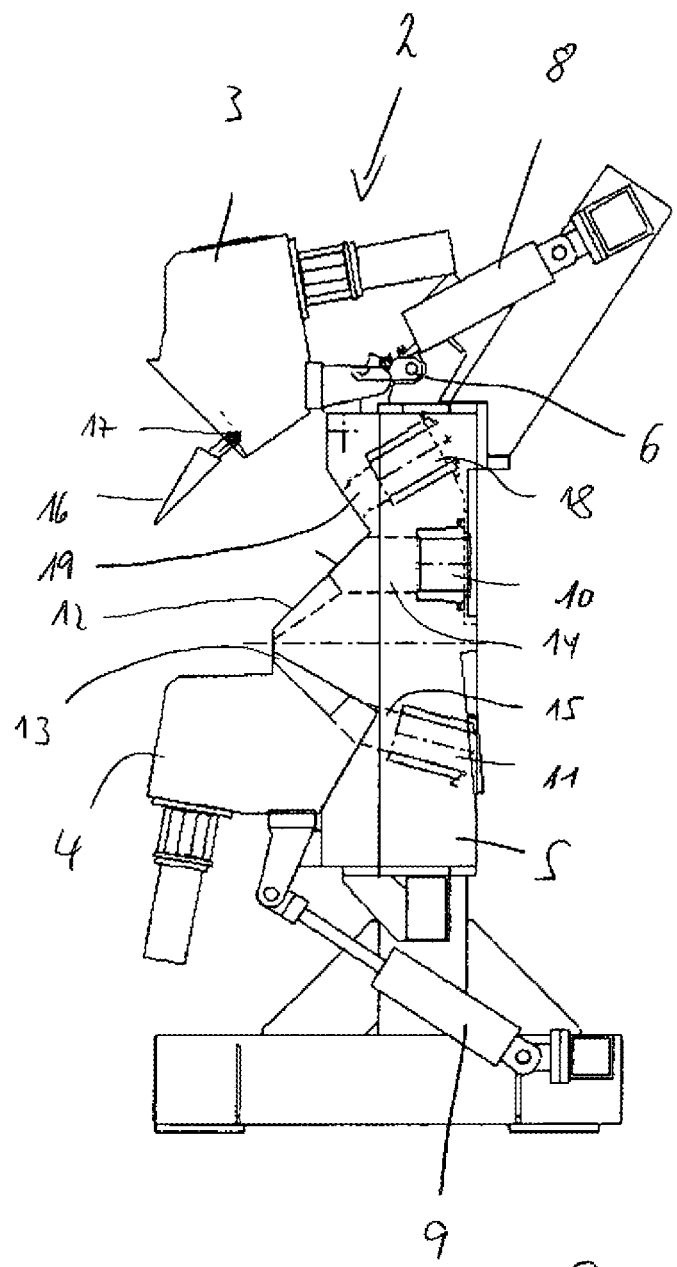
FIG. 4 shows the extrusion head according to FIG. 3 after opening of a flap-like expanding element.

FIG. 4 shows the arrangement according to FIG. 3 after the head part 3 has been pivoted upwardly about the pivot joint 6. For this purpose, the piston of the cylinder 8 has been retracted. It can be seen that, in accordance with the present embodiment, the expanding element 16 is pivotably connected through the pivot joint 17 in the manner of a flap to the head part 3.

Figure 5:
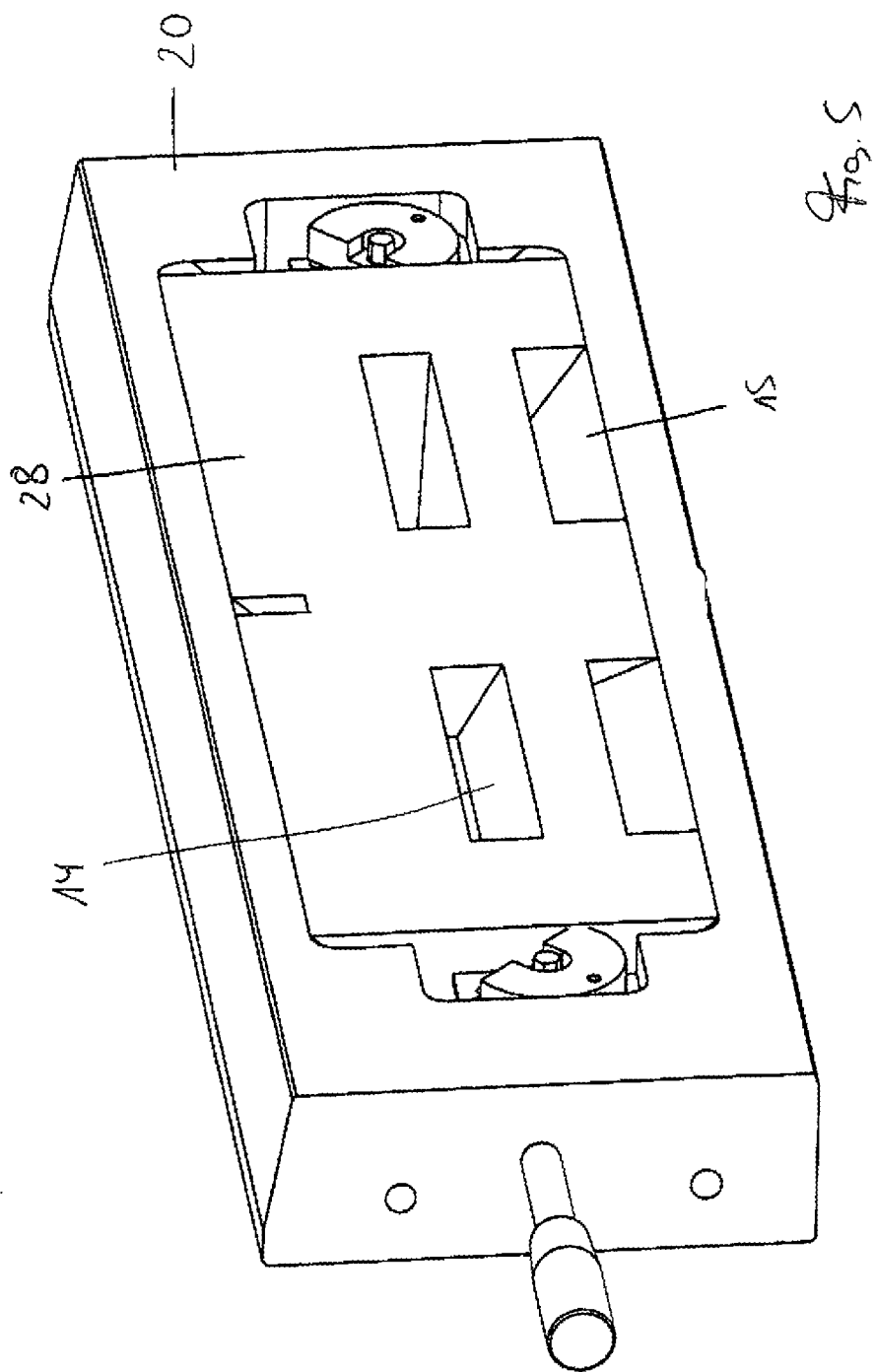
FIG. 5 is a perspective illustration of a cassette with flow channels, in a rear view.

FIG. 5 shows in a perspective view a cassette 20 with a viewing direction from the rear. The drawing shows entrances of the flow ducts 14, 15, 19 into the tool 28, called tongue or outer plate. The flow channels are rejoined in the tool.

Figure 6:
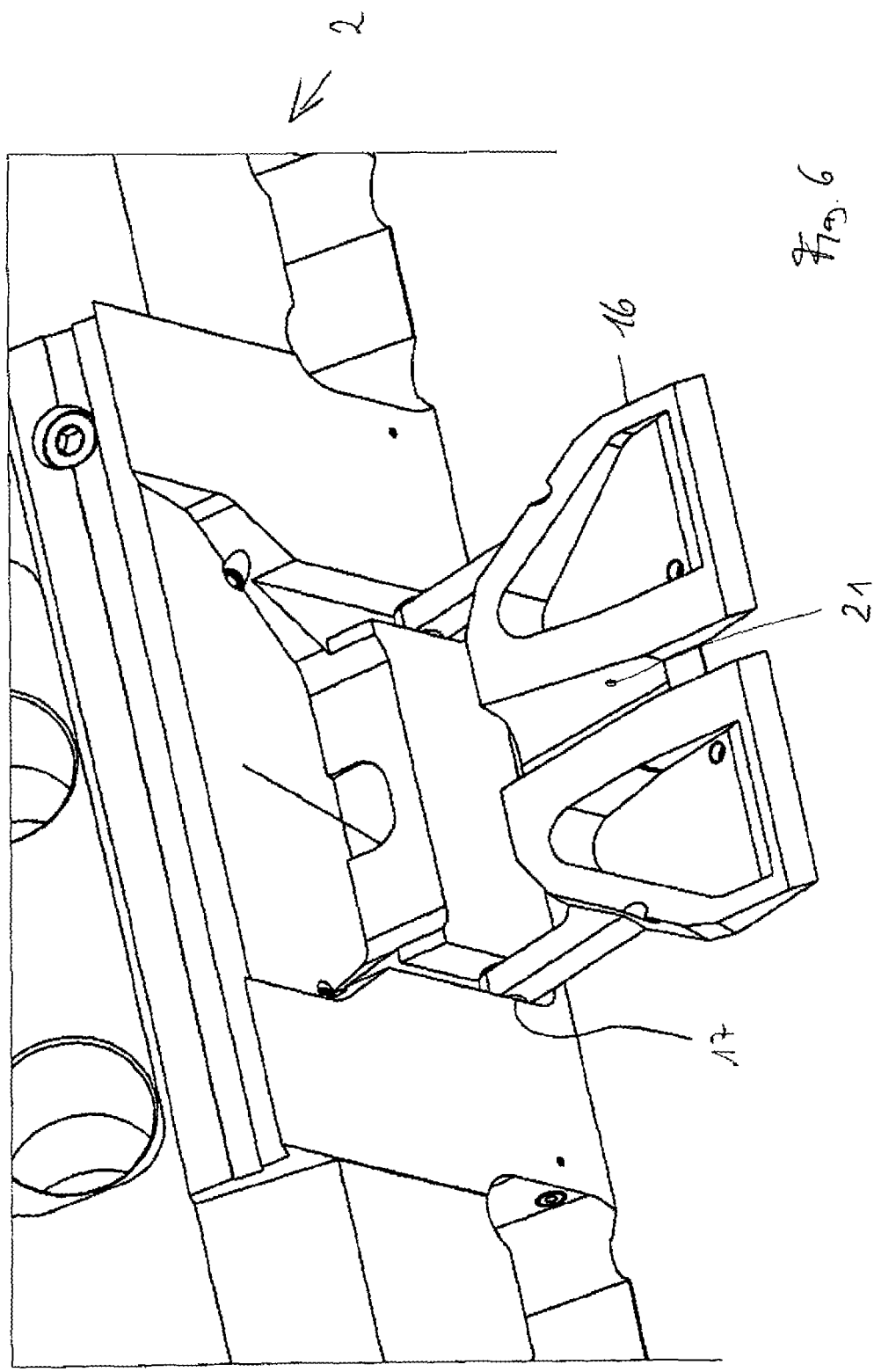
FIG. 6 shows an embodiment of a flap-like expanding element for an additional strip.

FIG. 6 shows an example of an embodiment of the expanding element 16. The expanding element 16 has a flow path 21 in the area of a first surface. This embodiment serves for the manufacture of a single strip.

In the area of a second surface located opposite the first surface, the expanding element 16 is constructed so as to be smooth. In a closed state, the first surface is arranged with the flow path 21 facing the head part 3.

FIG. 7 shows an embodiment of the expanding element 16 with three flow paths 22, 23, 24. Flow path blockers 25, 26 are arranged in the flow paths 22, 24, so that only the flow path 23 is open in the illustrated variation. This variation would be used for manufacturing one strip.

FIG. 8 shows an arrangement which has been modified as compared to the variation in FIG. 7 in which the flow paths 22, 24 are free and a flow path blocker 27 is arranged in the area of the flow path 23. This embodiment serves for manufacturing two strips.

For effecting the pivoting movement of the expanding element 16, pneumatic, electrical or hydraulic adjusting elements can be used. A manual pivotability is also considered.

In dependence on the respective use requirements, the flow paths 21, 22, 23, 24 can be constructed individually or in a branched configuration.

A special aspect of the present invention is to be seen in the fact that all employed flow paths are not already rejoined in the area of the head base 5 or the head parts 3, 4, but extend up to the tool 28 and are rejoined only there. This reinforces the achievement of a good flow behavior of the elastomer materials by means of an optimum configuration of all flow paths. An essentially uniform compression is present along the flow paths, so that the same flow directions can be maintained and tight deflections can be avoided. A continuous rejoining of all components then takes place only in the area of the tool 28, which reinforces a good adherence of the individual material areas at the joints thereof.

An optimum mass distribution is achieved by a separate entrance of the separated flow channels into the tool 28 and a good and reproducible symmetry of the manufactured profiles is made available. Moreover, the supply of the individual materials can be balanced well, which leads to short start-up periods of the tools 28 and an increased quality of the manufactured profiles.

The additional extruder used in accordance with the invention can be used in combination with two, three or four conventional standard extruders. The concrete number of required extruders depends on the number of different materials to be used. In principle, it is also possible to arrange more than one expanding element 16 in the area of the extrusion head 2. This then also correspondingly determines the number of required additional extruders.

The arrangement of the additional extruders for connection to the expanding element or elements 16, takes place in dependence on the constructive situation present. For example, the additional extruders can be arranged axially above or below the existing extruders of the extrusion head 2. Basically, it is also possible to extrude one or more rubber strips into the injection molding head 2 from any chosen other directions.

The invention claimed is:

1. An extruding device, comprising: an extrusion head for connection with at least two extruders; at least one tool for shaping a product from at least two extruded materials, the extrusion head including at least one pivotable head part; and at least one expanding element arranged on the extrusion head, wherein the expanding element is constructed so as to be substantially smooth in an area of a first surface and has in an area of a second surface facing away from the first surface at least one flow path for the extruded material, wherein the expanding element is pivotably connected to the pivotable extrusion head part by a pivot joint on the pivotable extrusion head part so as to form a flap, wherein the expanding element faces another head part of the extrusion head and in a closed state of the extrusion head is positioned between the pivotable head part and the another head part.

2. The device according to claim 1, wherein the extrusion head has a plurality of flow channels.

3. The device according to claim 1, wherein the expanding element is connectable through a flow channel to an additional extruder.

4. The device according to claim 1, further comprising connections for connecting to extruders, all of the connections being arranged on an outer side of the extrusion head.

5. The device according to claim 2, wherein rejoining of flow channels takes place in an area of the tool.

6. The device according to claim 1, wherein the expanding element has at least two flow paths.

7. The device according to claim 6, wherein at least one of the flow paths can be closed by a flow path blocker.

8. The device according to claim 1, wherein the extrusion head includes two pivotable head parts, the expanding element being pivotably connected to one of the head parts.

\* \* \* \* \*